United States Patent
Kline

(10) Patent No.: US 10,762,448 B2
(45) Date of Patent: Sep. 1, 2020

(54) METHOD, APPARATUS AND PROGRAM STORAGE DEVICE FOR SCHEDULING THE PERFORMANCE OF MAINTENANCE TASKS TO MAINTAIN A SYSTEM ENVIRONMENT

(75) Inventor: Christopher N. Kline, Firestone, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/072,354

(22) Filed: Mar. 25, 2011

(65) Prior Publication Data
US 2012/0072582 A1    Mar. 22, 2012

Related U.S. Application Data

(63) Continuation of application No. 10/635,397, filed on Aug. 6, 2003, now abandoned.

(51) Int. Cl.
*G06Q 10/06* (2012.01)

(52) U.S. Cl.
CPC ....... *G06Q 10/06* (2013.01); *G06Q 10/06314* (2013.01)

(58) Field of Classification Search
CPC .... G05B 1/00; G06Q 10/06; G06Q 10/06314; G06F 9/505; G06F 9/5083; H04L 67/1008
USPC ........................................................ 705/7.22
See application file for complete search history.

(56) References Cited

U.S. PATENT DOCUMENTS

| | | | | |
|---|---|---|---|---|
| 4,914,657 A | * | 4/1990 | Walter et al. ................... | 714/4.3 |
| 5,367,473 A | * | 11/1994 | Chu et al. ...................... | 702/186 |
| 5,432,932 A | * | 7/1995 | Chen ........................ | G06F 11/32 |
| | | | | 702/179 |
| 5,537,585 A | * | 7/1996 | Blickenstaff et al. | |
| 5,621,663 A | * | 4/1997 | Skagerling .................... | 702/186 |
| 5,732,240 A | * | 3/1998 | Caccavale ..................... | 711/118 |
| 5,761,677 A | * | 6/1998 | Senator ............... | G06F 11/1435 |
| 6,041,354 A | * | 3/2000 | Biliris ................... | G06F 9/4887 |
| | | | | 348/E7.073 |
| 6,059,842 A | * | 5/2000 | Dumarot ............ | G06F 9/44505 |
| | | | | 706/47 |
| 6,108,712 A | | 8/2000 | Hayes, Jr. | |
| 6,170,067 B1 | * | 1/2001 | Liu .......................... | G06F 1/26 |
| | | | | 714/31 |
| 6,173,322 B1 | * | 1/2001 | Hu ......................... | G06F 9/505 |
| | | | | 709/217 |
| 6,212,581 B1 | * | 4/2001 | Graf ............................... | 710/18 |

(Continued)

OTHER PUBLICATIONS

Non-Final Office Action dated Jan. 8, 2008 for U.S. Appl. No. 10/635,397.

(Continued)

*Primary Examiner* — Jonathan G Sterrett
*Assistant Examiner* — Stephen S Swartz
(74) *Attorney, Agent, or Firm* — Schmeiser, Olsen & Watts, LLP; Michael A. Petrocelli

(57) ABSTRACT

A method, apparatus and program storage device for scheduling the performance of maintenance tasks to maintain a system environment is disclosed. A parameter for a computer system is monitored to detect a need to perform at least one maintenance task. At least one maintenance task is performed when the monitoring detects the need to perform at least one maintenance task or at least once within a predetermined period.

12 Claims, 7 Drawing Sheets

(56) References Cited

U.S. PATENT DOCUMENTS

| | | | |
|---|---|---|---|
| 6,237,092 B1 | 5/2001 | Hayes, Jr. | |
| 6,240,527 B1* | 5/2001 | Schneider | G06F 11/1435 714/21 |
| 6,338,149 B1 | 1/2002 | Ciccone, Jr. et al. | |
| 6,377,993 B1* | 4/2002 | Brandt et al. | 709/227 |
| 6,412,026 B1* | 6/2002 | Graf | 710/18 |
| 6,453,383 B1* | 9/2002 | Stoddard | G06F 3/0607 707/999.202 |
| 6,556,952 B1* | 4/2003 | Magro | 702/183 |
| 6,567,853 B2* | 5/2003 | Shomler | 709/229 |
| 6,606,658 B1* | 8/2003 | Uematsu | 709/225 |
| 6,633,878 B1* | 10/2003 | Underwood | G06Q 10/10 |
| 6,714,979 B1* | 3/2004 | Brandt et al. | 709/225 |
| 6,728,748 B1* | 4/2004 | Mangipudi et al. | 718/105 |
| 6,745,286 B2* | 6/2004 | Staub et al. | 711/114 |
| 6,757,730 B1 | 6/2004 | Lee et al. | |
| 6,766,420 B2* | 7/2004 | Rawson | 711/133 |
| 6,985,901 B1* | 1/2006 | Sachse | H04L 41/5032 |
| 6,990,666 B2* | 1/2006 | Hirschfeld et al. | 718/104 |
| 7,058,600 B1* | 6/2006 | Combar et al. | 705/34 |
| 7,065,588 B2* | 6/2006 | Konda | H04L 67/2823 709/246 |
| 7,194,757 B1* | 3/2007 | Fish et al. | 725/121 |
| 7,349,348 B1* | 3/2008 | Johnson | H04L 29/12339 370/254 |
| 7,363,543 B2* | 4/2008 | Peebles et al. | 714/26 |
| 7,441,261 B2* | 10/2008 | Slater et al. | 725/96 |
| 7,617,201 B1* | 11/2009 | Bedell | G06F 16/2462 |
| 8,073,721 B1* | 12/2011 | Lewis | 705/7.12 |
| 2002/0152305 A1* | 10/2002 | Jackson | H04L 12/26 709/224 |
| 2002/0166117 A1* | 11/2002 | Abrams | G06Q 20/145 717/177 |
| 2002/0194319 A1* | 12/2002 | Ritche | 709/223 |
| 2003/0009449 A1 | 1/2003 | Grubbs et al. | |
| 2003/0009552 A1* | 1/2003 | Benfield | H04L 41/0213 709/224 |
| 2003/0023719 A1* | 1/2003 | Castelli et al. | 709/224 |
| 2003/0065762 A1* | 4/2003 | Stolorz | H04L 29/06 709/223 |
| 2003/0072263 A1 | 4/2003 | Peterson | |
| 2003/0093619 A1* | 5/2003 | Sugino | G06F 3/0605 711/114 |
| 2003/0110007 A1* | 6/2003 | McGee | G06F 11/0709 702/179 |
| 2003/0115421 A1* | 6/2003 | McHenry | H04L 29/06 711/133 |
| 2003/0191795 A1* | 10/2003 | Bernardin | G06F 9/505 718/105 |
| 2004/0064552 A1* | 4/2004 | Chong | G06F 11/3006 709/224 |
| 2004/0083263 A1* | 4/2004 | Richardson | H04L 63/0428 709/204 |
| 2004/0255290 A1* | 12/2004 | Bates et al. | 717/174 |
| 2005/0033625 A1 | 2/2005 | Kline | |

OTHER PUBLICATIONS

Final Office Action dated Aug. 1, 2008 for U.S. Appl. No. 10/635,397.

"McAfee Utilities User's Guide: Version 4.0", pp. 22-23, 33, 39-40, 43-44, 48-50, copyright 2001.

"Description of the Low Disk Space Notification in Windows XP", http://support.microsoft.com/kb/285107 (retrieved Jan. 4, 2008).

"How to Use the Backup Utility to Back Up Files and Folders in Windows XP Home Edition", http://support.microsoft.com/kb/320820/en-us, copyright 2008.

"Disk Defragmenter Error Codes", http://www.aumha.org/a/defragerr.php, Jul. 2, 2001.

Mcfedries, Paul; "The Complete Idiot's Guide to Windows XP", Publisher: Alpha, pp. 355-356, Nov. 1, 2001.

"How to Automate the Disk Cleanup Tool in Windows XP", http://support.microsoft.com/kb/315246 (retrieved Jul. 23, 2008).

* cited by examiner

| | | |
|---|---|---|
| 410 | SAVE COMMAND | USED TO DUMP ALL CONFIGURATION INFORMATION TO A TEXT FILE FOR REUSE. THE LAST TWO ITERATIONS MAY BE KEPT ACTIVELY, WITH OLDER VERSIONS RETAINED AS ARCHIVES — 412 |
| 420 | CHECKPOINT COMMAND | CAUSES ALL OBJECTS TO BE WRITTEN TO LOG FOR IMMEDIATE RECOVERY IF CORRUPTED. FOR ALL RUNNING QUEUE MANAGERS THAT USE LINEAR LOGGING — 422 |
| 430 | CLEAN LOG COMMAND | THE CLEAN LOG SCRIPT LOOKS IN THE ERROR LOGS FOR THE LATEST TRANSACTION LOGS THAT ARE NEEDED FOR FULL RECOVERY. THE CLEAN LOG SCRIPT WILL THEN TAKE OLDER LOGS AND ZIP THEM UP TO CONSERVE SPACE. USED FOR ALL RUNNING QUEUE MANAGERS USING LINEAR LOGGING. — 432 |
| 440 | PRUNE COMMAND | PROVIDED TO PRUNE OLD COMPRESSED LOGS FROM CLEAN LOGS THAT ARE NO LONGER NEEDED. THE PRUNE COMMAND KEEPS LINEAR LOGGING QUEUE MANAGERS FROM TAKING OVER THE FILESYSTEM AND FILLING IT UP. THE PRUNE UTILITY PROVIDES ADMINISTRATORS WITH THE ABILITY TO ROLL BACK TO AN EARLIER POINT IN TIME, BUT ALSO KEEPS FILE SYSTEMS FREE OF OBSOLETE FILES. — 442 |
| 450 | SAVE AUTHORIZATIONS COMMAND | PROVIDES RECOVERY OF AUTHORIZATIONS IN CASE A QUEUE MANAGER NEEDS TO BE REBUILT OR IF MOVED TO ANOTHER BOX — 452 |
| 460 | ARCHIVE OLD SAVE FILES COMMAND | PROVIDES LOGS BEYOND THE STANDARD TWO SAVE FILES FOR EACH QUEUE MANAGER. THE ARCHIVE OLD SAVE FILES COMMAND TAKES OLD SAVE FILES PERIODICALLY, AND COPY THEM TO AN ARCHIVE DIRECTORY. — 462 |

METHOD, APPARATUS AND PROGRAM STORAGE DEVICE FOR SCHEDULING THE PERFORMANCE OF MAINTENANCE TASKS TO MAINTAIN A SYSTEM ENVIRONMENT

CROSS REFERENCE TO RELATED APPLICATION

This is application is a Continuation Application of U.S. patent application Ser. No. 10/635,397 filed Aug. 6, 2003 and now abandoned.

BACKGROUND OF THE INVENTION

1. Field of the Invention

This invention relates in general to maintaining a computer system, and more particularly to a method, apparatus and program storage device for scheduling the performance of maintenance tasks to maintain a system environment.

2. Description of Related Art

The defining environment for application development is changing. E-business applications are being used to leverage the Internet as a platform for building and integrating applications over a network environment. Further, application servers are moving from a processor-based operating system to an Internet-based operating system or network computing. However, this term may be somewhat ambiguous. Nevertheless, this term is increasingly being used to refer to virtual applications that are assembled from many different components that run on many machines across a network as if they were a single system. Components can range from entire centralized applications to single modules of a larger distributed application. Most important, it is becoming clear that only virtual applications can deliver the flexibility to meet many of the lead-edge needs of today's corporate information systems. Accordingly, these application servers are being used to integrate applications, business processes, and data. To leverage investments, businesses are turning to open standard based infrastructures to allow solutions to be crafted based on the best products for an application, process, etc. rather being locked into a single-vendor solution.

However, such an open standard integrated solution throughout the enterprise requires tools and systems to accomplish the integration, connectivity, modeling, monitoring and management functions. People, processes, information, and systems must be integrated throughout the enterprise. Connectivity refers to connecting applications and systems across a company and to partners and customers. Modeling includes the ability to model and simulate business processes to graphically represent the flow of work across people and application systems. Monitoring is provided by tracking business processes as they execute in applications and systems across the enterprise. Management of the enterprise demands visualization of immediate operational results of business processes. This critical knowledge enables review of business and system processes over a period of time so that bottlenecks and problem areas can be identified and corrected.

In order to connect processes and to transform data, a diverse collection of functions must be provided. This diverse collection of functions is referred to as middleware. The term middleware is an inclusive term that encompasses many disparate functions that do not easily fit within other architectural components. Thus, middleware may be considered an aggregation of distinct subcomponents. Middleware provides application services that were once written into applications. However, these services today are provided in an independent infrastructure layer. Middleware enhances application integration by providing uniform mechanisms to bridge old and new technologies, or by enabling dissimilar elements to work together.

One type of middleware is message-oriented middleware. Message-oriented middleware allows application programs that may be distributed across similar or dissimilar platforms and/or network protocols to exchange data with each other using messages and queues. In order to maintain a clean and efficient environment, certain maintenance procedures must be run regularly. Such maintenance tasks, however, are not easily performed by built-in utilities. In fact some important tasks cannot be performed at all by built-in utilities. Thus, the system administrator is left with the task of determining how to best carry out these tasks. Still, not all administrators are skilled in programming such tasks. Moreover, administrators may not know the optimum time to run maintenance tasks. For example, maintenance tasks may be scheduled to run too often. Because such maintenance tasks may be resource intensive, the performance of the server may suffer. Alternatively, maintenance tasks may not be scheduled often enough and therefore the system may not be operating efficiently.

It can be seen then that there is a need for a method, apparatus and program storage device for scheduling the performance of maintenance tasks to maintain a system environment.

SUMMARY OF THE INVENTION

To overcome the limitations in the prior art described above, and to overcome other limitations that will become apparent upon reading and understanding the present specification, the present invention discloses a method, apparatus and program storage device for scheduling the performance of maintenance tasks to maintain a system environment.

The present invention solves the above-described problems by providing a way for administrators can skillfully maintain servers. The present invention determines when to run maintenance operations based on predetermined system criteria.

A method in accordance with an embodiment of the present invention includes monitoring a parameter for a computer system to detect a need to perform at least one maintenance task and performing at least one maintenance task when the monitoring detects the need to perform at least one maintenance task or at least once within a predetermined period.

In another embodiment of the present invention, a system for scheduling the performance of maintenance tasks to maintain a system environment is provided. The system includes a maintenance tool for providing resources for performing at least one maintenance task and a maintenance scheduling device for monitoring a parameter for a computer system to detect a need to perform at least one maintenance task and causing the maintenance tool to perform at least one maintenance task when the maintenance scheduling device detects the need to perform at least one maintenance task or at least once within a predetermined period.

In another embodiment of the present invention, another system for scheduling the performance of maintenance tasks to maintain a system environment is provided. This system includes means for providing resources for performing at least one maintenance task and means for monitoring a parameter for a computer system to detect a need to perform at least one maintenance task and causing the means for providing resources to perform at least one maintenance task when the means for monitoring detects the need to perform at least one maintenance task or at least once within a predetermined period.

In another embodiment of the present invention, a program storage medium tangibly embodying one or more programs of instructions executable by the computer to perform a method for scheduling the performance of maintenance tasks to maintain a system environment is provided. The method includes monitoring a parameter for a computer system to detect a need to perform at least one maintenance task and performing at least one maintenance task when the monitoring detects the need to perform at least one maintenance task or at least once within a predetermined period.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4 illustrates examples of management tools according to an embodiment of the present invention;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for scheduling the performance of maintenance tasks to maintain a system environment. Administrators use the present invention to skillfully maintain servers. When to run maintenance operations is determined based on predetermined system criteria.

Figure 1:
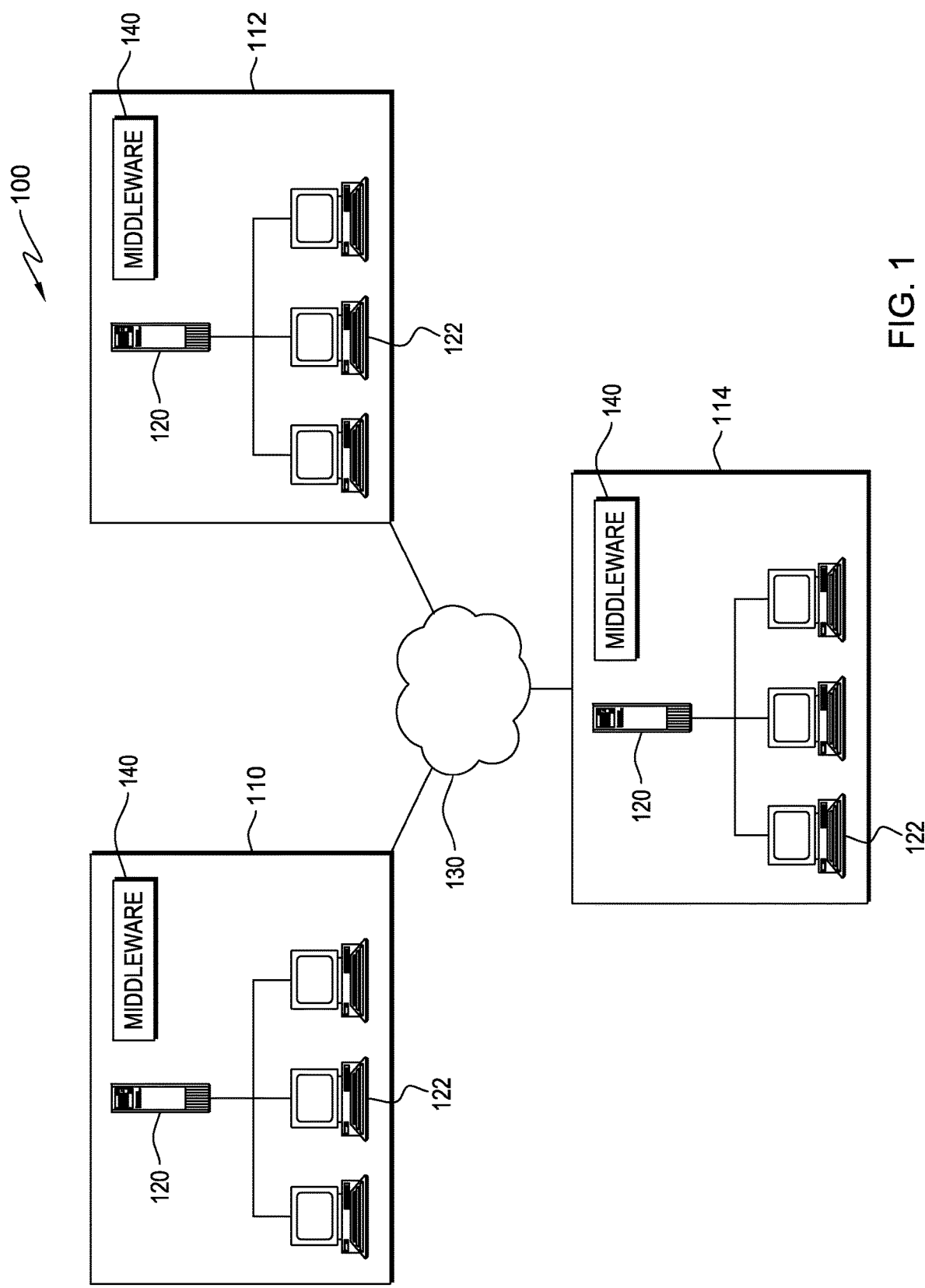
FIG. 1 illustrates a distributed computing environment according to an embodiment of the present invention.

FIG. 1 illustrates a distributed computing environment 100 according to an embodiment of the present invention. FIG. 1 illustrates three computing domains 110-114. The three computing domains 110-114 include at least one server 120 and at least one client 122 networked to the server 120. The domains 110-114 are coupled through a network 130. Applications running in each of the domains 110-114 are usually built using centralized approaches, wherein the business rules and data that comprise the application reside on a single mainframe or network server, and lack ways to participate as components on the network. To prevent isolation between the domains 110-114, middleware services 140 are used to provide uniform mechanisms to bridge the different technologies and to enable dissimilar elements to work together. Middleware 140 comprises computer software that runs on a computer in at least one of the clusters 110-114.

Figure 2:
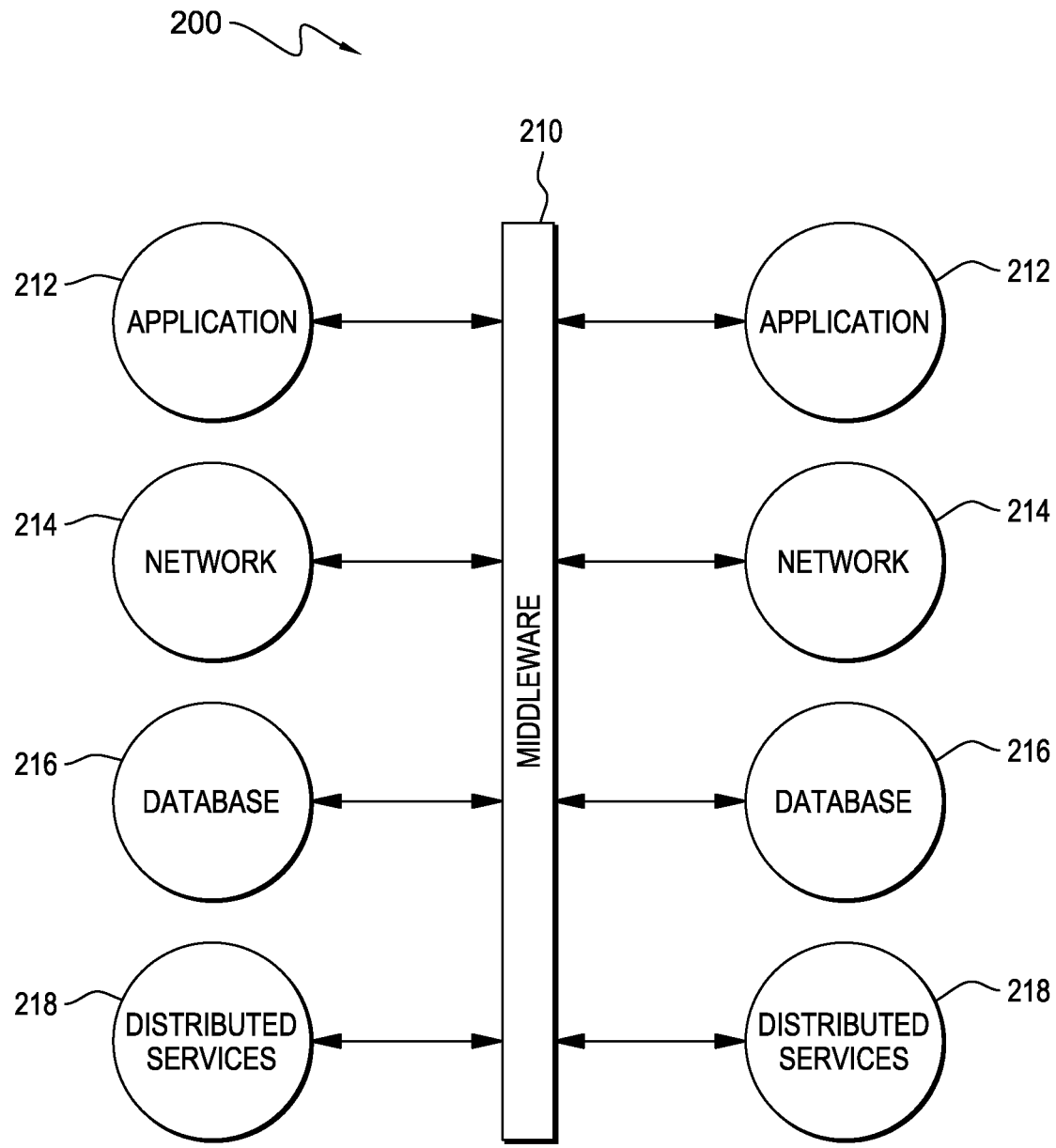
FIG. 2 illustrates a middleware layer infrastructure according to an embodiment of the present invention.

FIG. 2 illustrates a middleware layer infrastructure 200 according to an embodiment of the present invention. In FIG. 2 the middleware layer 210 provides an independent infrastructure layer that sits between applications 212, networks 214, databases 216, and distributed services communications mechanisms 218. The middleware layer 210 enhances application integration by providing uniform mechanisms to bridge between the applications 212, networks 214, databases 216, and distributed services communications mechanisms 218. Management of the infrastructure is facilitated by the middleware layer 210 by allowing for the centralized management of application services that are shared by many applications. The middleware layer 210 also reduces the costs and complexity of implementing change in infrastructure services by enabling changes to be made across many applications, rather than to each application that uses a service.

One type of middleware services that is used to ensure that the applications and other functions are running smoothly is maintenance utilities. For example, in a distributed computing environment, certain maintenance procedures must be run regularly to ensure the system is operating properly. For example, servers in a computing environment must be monitored to prevent crashes and/or to facilitate peak performance. Such maintenance tasks, however, are not easily performed by built-in utilities. In fact some important tasks cannot be performed at all by built-in utilities. Thus, the system administrator is left with the task of determining how to best carry out these tasks. Still, not all administrators are skilled in programming such tasks. Moreover, administrators may not know the optimum time to run maintenance tasks. Thus, the present invention provides a maintenance tool to provide an administrator the ability to determine when settings changed as well as the option of restoring old settings through saved files.

Figure 3:
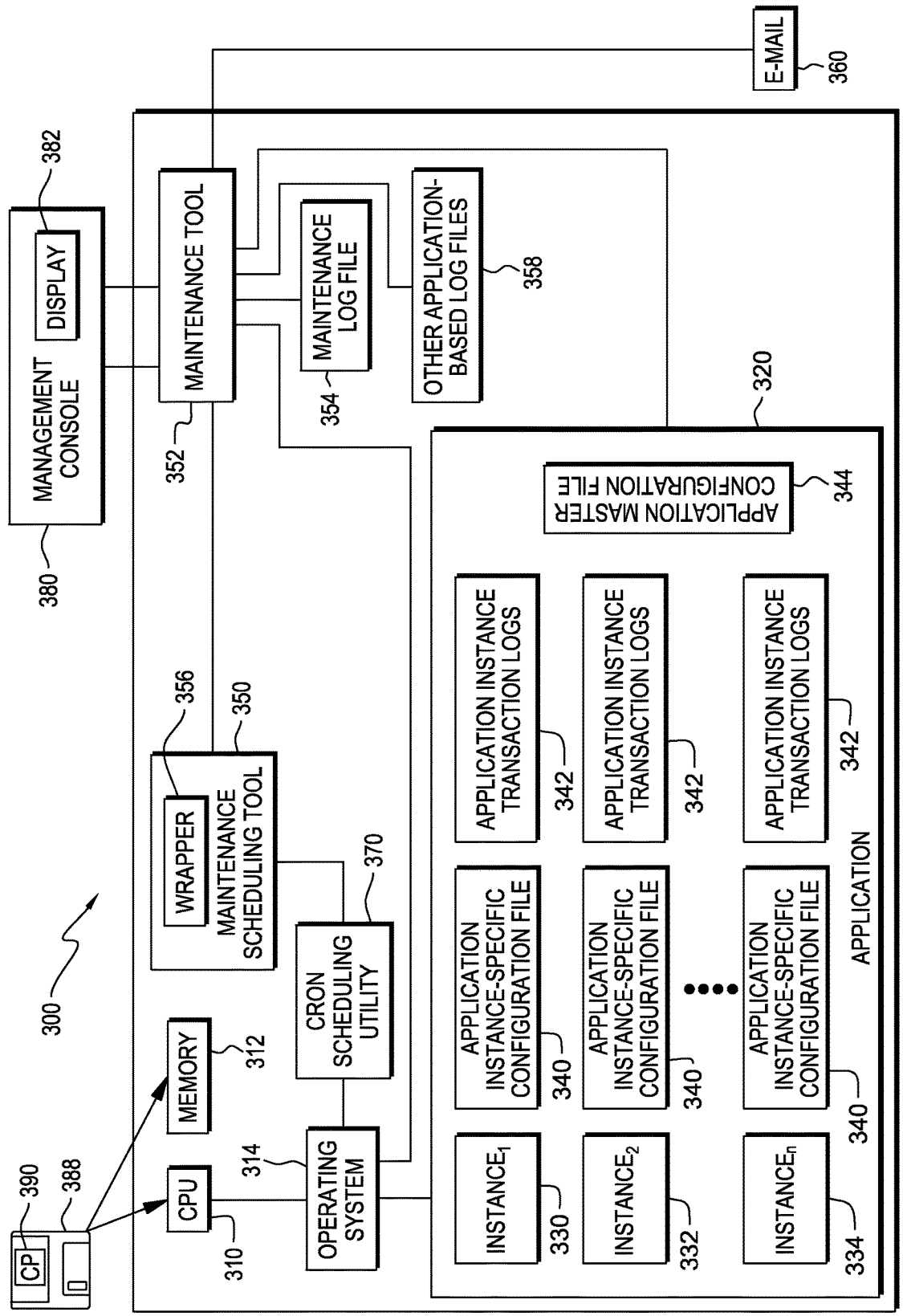
FIG. 3 illustrates a system for scheduling the performance of maintenance tasks to maintain a system environment according to an embodiment of the present invention.

FIG. 3 illustrates a system 300 for scheduling the performance of maintenance tasks to maintain a system environment according to an embodiment of the present invention. In FIG. 3, a central processing unit 310 may access memory 312 and runs an operating system 314. The operating system 314 may access application 320. The application 320 includes instances 330-334. Master configuration file 344 identifies each of the application instances configured on the system, as well as default settings for each instance. Each instance 330-334 may include an application instance-specific configuration file 340 and application instance transaction logs 342.

The present invention includes a maintenance scheduling tool 350 to schedule maintenance tasks. Maintenance tasks are providing via the maintenance tools 352. The maintenance tools 352 maintain a maintenance log file 354. The maintenance tools 352 are part of a larger suite of tools created to provide daily maintenance routines, as well as routines that copy settings to an archive location for later point-in-time recovery, if necessary. A script is provided via the maintenance scheduling tool 350 to determine how often the maintenance tools 352 are to be performed. For example, administration setup maintenance may need to be performed nightly on all servers. However, some servers that are heavily used may need maintenance run more often than just once a day. To statically schedule run times, however, may be too little or too much.

In one embodiment of the present invention, the script provided in the maintenance scheduling tool 350 to control the maintenance tools 352 is a korn-shell script. A korn-shell script is a program that reads textual commands from the user or from a file, converts them into operating system commands, and executes them. A wrapper 356 sits on top of the script in the maintenance scheduling tool 350 to dynamically determine whether the maintenance tools 352 should be run. For example, the wrapper 356 may look at regular intervals such as every 30 minutes. The wrapper 356 will cause the maintenance tools to be run at least every 24 hours or other preset period, but also self-regulates in case log filesystems are in danger of filling up. Thus, the wrapper 356 in the maintenance scheduling tool 350 monitors server conditions and runs the maintenance tools 352 whenever prudent. However, the present invention is not meant to be limited to a particular period or pattern. In this manner, the utilities 352 function as a "maintenance on demand" package of tools. If the maintenance tools 352 are run too often thereby indicating some sort of problem on the server, an alert is generated and the administrator is paged, for example, via email 360.

Some commands may be executed directly within the interpreter itself, e.g., setting variables or control constructs, while others may cause it to load and execute other files. Unix's command interpreters are known as shells. The maintenance tools 352 employ several other external programs to complete its operation.

The corn scheduling utility 370 is an operating system scheduler that monitors for a set time and then executes a predetermined command. For example, the maintenance tools 352 may be scheduled to complete once each night and then log all operations to an output log. The maintenance tools 352 then may email 360 the administrator whenever it doesn't complete successfully. This provides administrators with the ability to manage problems before they grow and take down the server. For example, the maintenance tools may be used to clear unneeded log space.

Log files 358, such as the channel exit log file, are pruned to keep from growing too large. Log files 358 may have a preset size, and once full, existing files are copied to a backup file. Any "error" output may be emailed to the administrator for review. Also, all program activity may be logged to a file 358 for review; and to track whether maintenance was started manually or via a corn scheduling utility.

A management console 380 provides an administrator access to and control of the maintenance tools 352 and scheduler 350. The management console 380 may include a display 382 for displaying status or other data provided by the maintenance tools 352.

FIG. 4 illustrates examples of management tools 400 according to an embodiment of the present invention. FIG. 4 illustrates the save command 410, which is used to dump all configuration information to a text file for reuse 412. The last two iterations may be kept actively, with older versions retained as archives. Another tool is the built-in checkpoint command 420 for all running queue managers that use linear logging. (A queue manager is an application instance for asynchronous messaging applications such as IBM WebSphere MQ). The built-in checkpoint command 420 causes all objects to be written to log for immediate recovery if corrupted 422.

A clean log command 430 may be provided for all running queue managers using linear logging. The clean log script 430 looks in the error logs for the latest transaction logs that are needed for full recovery 432. The clean log script 430 will then take older logs and zip them up to conserve space. A prune command 440 may be provided to prune old compressed logs from clean logs that are no longer needed. The prune command 440 keeps linear logging queue managers from taking over the filesystem and filling it up 442. If linear logging queue managers are provided and do not run this, the filesystem will eventually fill up and take the queue manager down, causing an outage. The prune utility 440 provides administrators with the ability to roll back to an earlier point in time, but also keeps file systems free of obsolete files.

The save authorizations script 450 is a command that should be run periodically for all running queue managers. The save authorization script 450 provides recovery of application-based authorizations in case a queue manager needs to be rebuilt, or if moved to another box 452. Such scripts may be kept in a specified log file. For example, ten of the authorization scripts may be kept to provide 2.5 months' ability to recover should problems be encountered. An archive-old-configuration-files script 460 provides logs beyond the standard two configuration files for each queue manager. The archive-old-configuration-files command 460 takes old configuration files periodically, and copies them to an archive directory 462. For example, if taken twice weekly, 50 of these archive files may be kept to provide six full months recovery ability. The archive-old-configuration-files feature is especially helpful for queue managers whose definitions (configuration) change regularly, or where non-standard administrators may have access to alter objects, and a record of it needs to be kept.

Those skilled in the art will recognize that the present invention is not meant to be limited to the maintenance tasks illustrated above with reference to FIG. 4. Rather, embodiments in accordance with the present invention may run any type of maintenance tools based on system criteria. Further, by combining maintenance tasks, a maintenance scheduling tool according to embodiments of the present invention may provide a comprehensive maintenance routine. For example, the combination of the save file command 410 and the save authorization script 450 allows a complete snapshot of activity that can later be used to fix problems or restore configurations.

Figure 5:
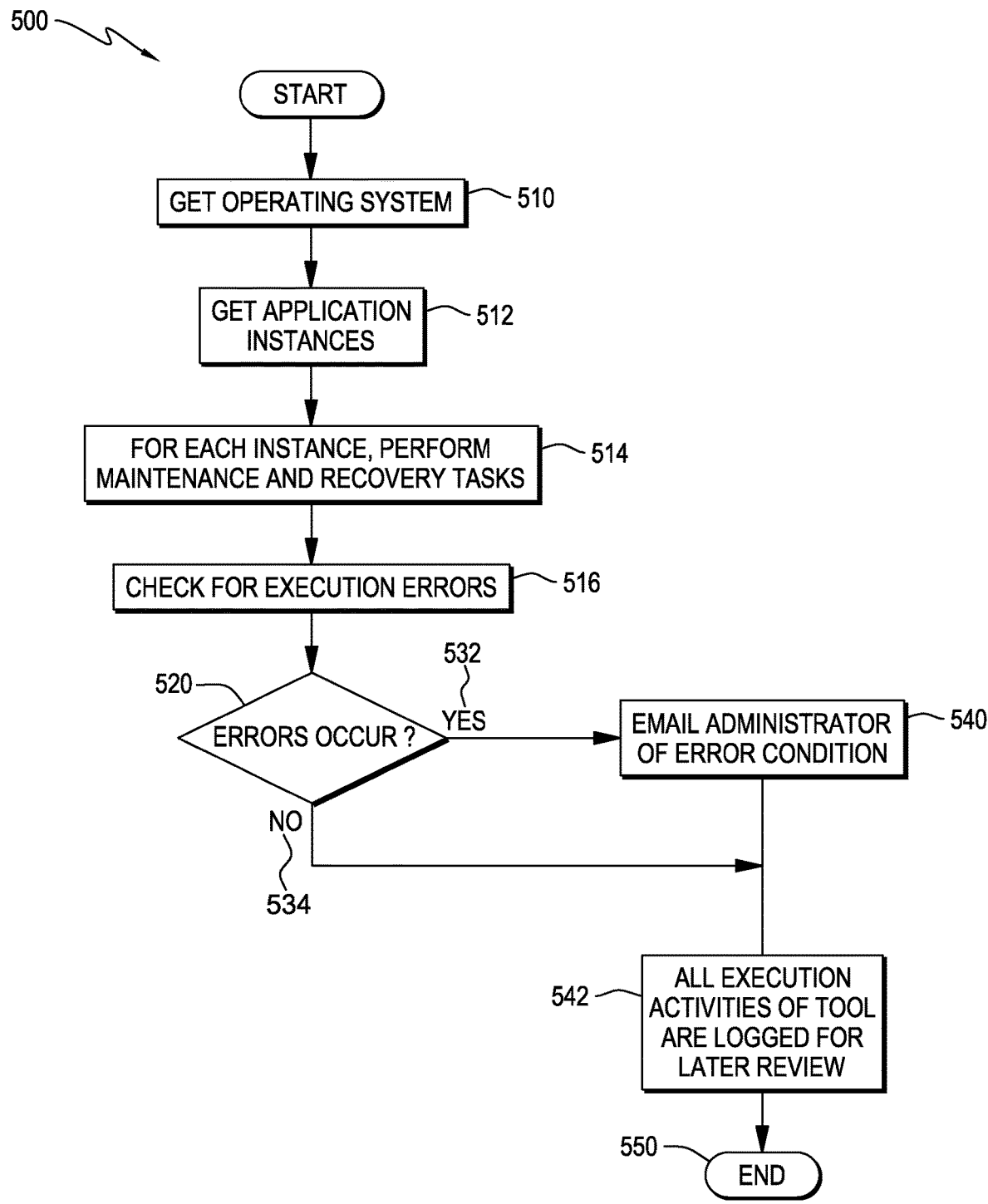
FIG. 5 illustrates a flow chart of the maintenance program execution according to an embodiment of the present invention.

FIG. 5 illustrates a flow chart 500 of the maintenance program execution according to an embodiment of the present invention. In FIG. 5, the tool determines the operating-system type and tailors execution to the specified environment 510. Application instances are then retrieved 512. For each instance, maintenance and recovery-preparation tasks are performed 514. Errors during execution of the maintenance and recovery-preparation tasks are monitored 516. A determination is made whether errors occurred 520. If errors occurred 532, the administrator is alerted of the error condition 540. If not 534, the maintenance program terminates 550. All execution activities are logged for later review 542.

Figure 6:
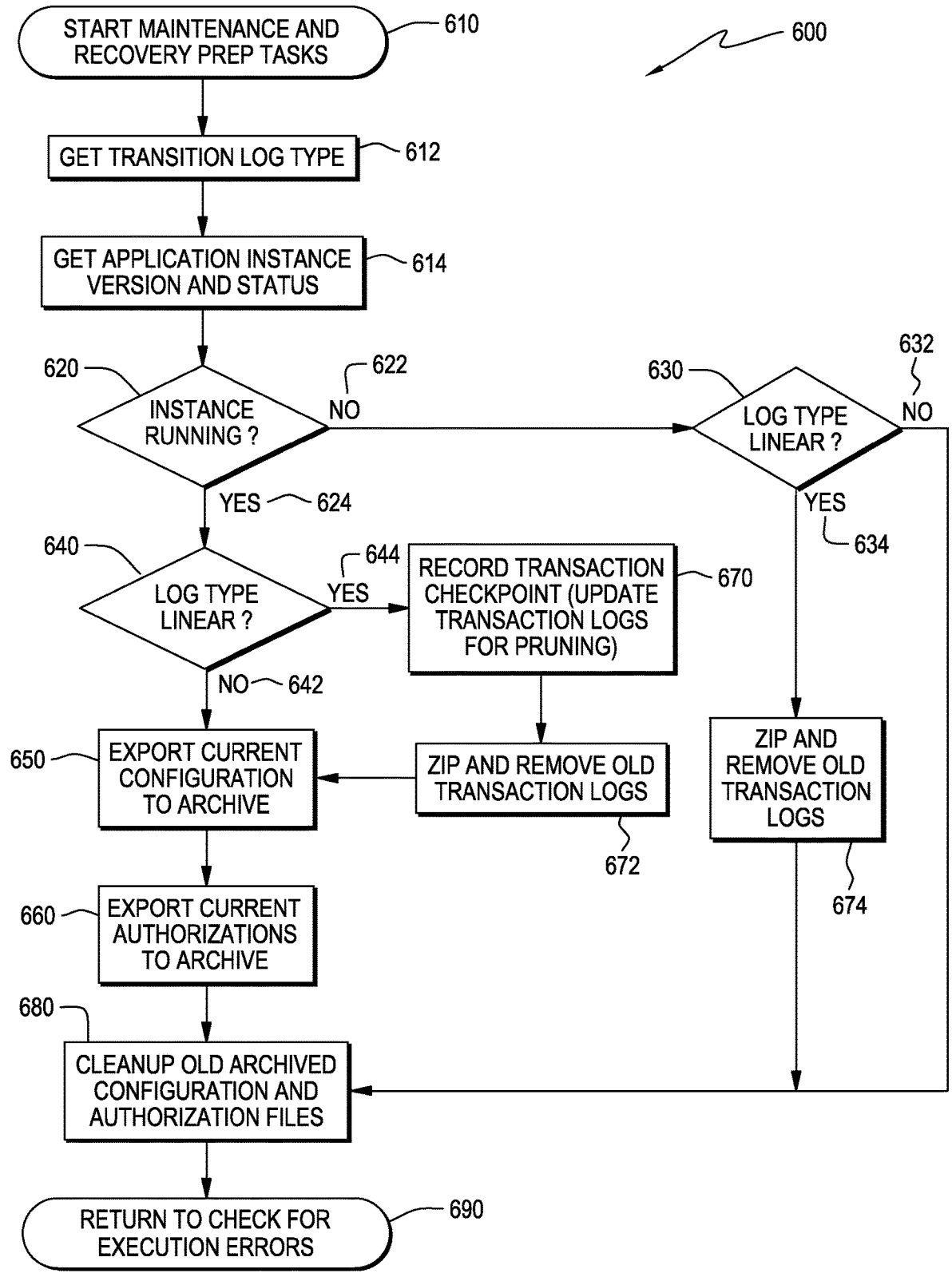
FIG. 6 illustrates a detailed flow chart for the maintenance and recovery task operations according to an embodiment of the present invention.

FIG. 6 illustrates a detailed flow chart 600 for the maintenance and recovery task operations (e.g., block 514 of FIG. 5) according to an embodiment of the present invention. In FIG. 6, the maintenance and recovery task is initiated 610. A transaction log type is obtained 612. The application instance version and status is also obtained 614. A determination is made whether the instance is running 620 and whether the log type is linear or circular 630, 640. If the instance is not running 622 and the system is circular 632, the archived configuration and authorization files are cleaned-up 680 and the system returns to check for execution errors 690.

If the instance is running 624 and the system is circular 642, the current configuration is exported to an archive 650. The current authorizations are also exported to an archive 660. Then, the archived configuration and authorization files are cleaned-up 680 and the system returns to check for execution errors 690.

If the instance is running 624 and the system is linear 644, the transaction checkpoint is recorded 670, e.g., the transaction log files are updated for pruning. The old transaction logs are zipped and removed 672. Because the instance is running, the current configuration is exported to an archive 650. The current authorizations are also exported to an archive 660. Then, the archived configuration and authorization files are cleaned-up 680 and the system returns to check for execution errors 690.

If the instance is not running 622 and the system is linear 634, the old transaction logs are zipped and removed 674. Because the instance is not running 622, the archived configuration and authorization files are merely cleaned-up 680 and the system returns to check for execution errors 690. Those skilled in the art will recognize that the blocks deciding whether the log type is linear or circular 630, 640 may be the same process, and in a like manner so may the blocks where old transaction logs are zipped and removed 672, 674.

Furthermore, those skilled in the art will recognize that the present invention is not meant to be limited to the maintenance tasks illustrated above with reference to FIG. 6. Rather, embodiments in accordance with the present invention may run any type of maintenance tools based on system criteria. Examples of additional maintenance tasks that may be performed according to the maintenance scheduling tool of the present invention include, but are not limited to, providing database consistency checks, ensuring database compaction, performing full-text index generation, performing view recalculations, etc.

Figure 7:
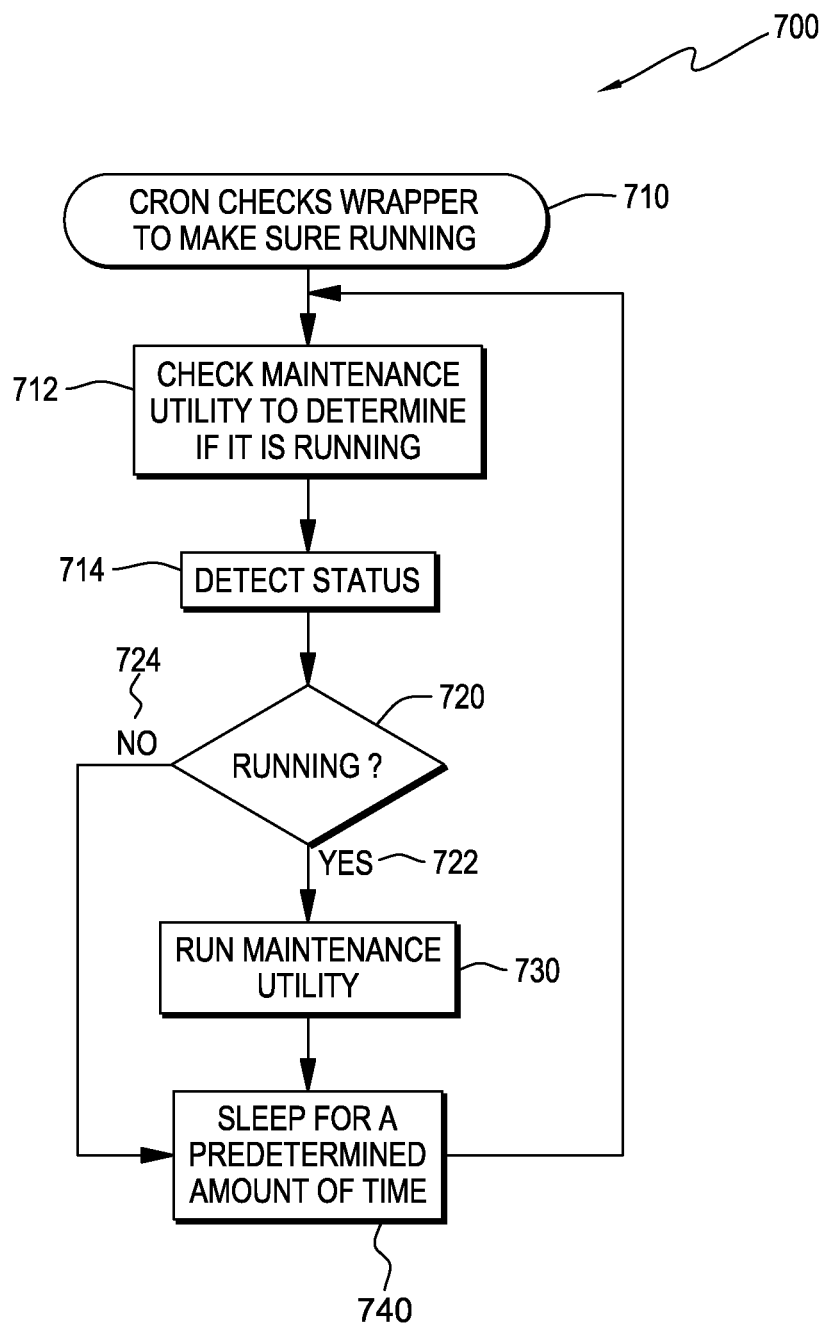
FIG. 7 illustrates the dynamic execution of the maintenance utility according to an embodiment of the present invention.

FIG. 7 illustrates the dynamic execution of the maintenance utility 700 according to an embodiment of the present invention. In FIG. 7, the corn scheduling utility checks the wrapper utility according to a schedule 710, e.g., every 30 minutes, once daily, at set times, etc., to determine if the wrapper that manages execution of maintenance tools is running. (The corn utility only makes sure the wrapper is running; the wrapper utility then runs continuously and periodically checks whether maintenance should be executed.) If it is not found to be running, the corn scheduling utility starts the wrapper, which then monitors the need for maintenance in a dynamic, continuous fashion. The wrapper then determines whether the maintenance tools are already running 712. If the maintenance tools are actively executing currently, the wrapper will not start parallel maintenance tasks. Next, the need for maintenance is ascertained through checking current conditions such as free disk space 714. A determination is made whether the maintenance utility should be performed now 720 (for example, if maintenance tasks have not yet been performed today, if free disk space is getting too low, etc.). If not 724, the wrapper utility sleeps again for a predetermined amount of time 740, after which the process is repeated. If the maintenance utility should be run now 722, the maintenance utility is performed 730.

The process illustrated with reference to FIGS. 1-7 may be tangibly embodied in a computer-readable storage device, e.g. one or more of the fixed and/or removable tangible data storage devices 388 illustrated in FIG. 3, or other data storage. The computer program 390 may be loaded into memory 312 to configure the system 300 for execution of the computer program 390. The computer program 390 include instructions which, when read and executed by a processor, such as central processing unit 310 of FIG. 1, causes the devices to perform the steps necessary to execute the steps or elements of an embodiment of the present invention.

Accordingly, embodiments of the present invention ensure that the servers are operating according to specifications. Referring again to FIG. 3, the maintenance tool 352 periodically performs maintenance tasks via control of the maintenance scheduling device 350, and if any of the tasks cannot be accomplished, or if an error is detected, the maintenance tool alerts the system administrator. The frequency that maintenance scheduling device 350 causes the maintenance tool 352 to run is determined according to predetermined criteria, e.g., timing, system conditions such as disk space availability, server usage, etc.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:
1. A method for detecting a problem with a server, said method comprising
periodically checking at an initial frequency implied by a constant time interval, by a computer using a scheduling utility, a wrapper utility according to a schedule to determine whether or not the wrapper utility that manages execution of a maintenance program tool is running, said maintenance program tool configured to perform maintenance tasks on a server to maintain a system environment in which the server operates;
in response to a determination via said periodically checking that the wrapper utility is running, ascertaining, by the computer using the wrapper utility, whether or not the maintenance program tool is running;
in response to a determination via said ascertaining that the maintenance program tool is running, during each of a plurality of first periods, dynamically monitoring, by the computer via execution of a maintenance scheduling tool, respective amounts of available disk space in the server, and for each of the first periods, responsive to a first dynamic determination by the maintenance scheduling tool that the respective amount of available disk space is less than a first predetermined threshold, dynamically changing, by the computer via execution of the maintenance scheduling tool, the frequency at which the maintenance tasks on the server are periodically performed, via execution of the maintenance program tool, to a first, different frequency implied by a constant first time interval to increase the available disk space to ensure that free disk space is not too low, wherein successive performances of the main- tenance tasks in each first period are separated in time by the constant first time interval;

during each of a plurality of second periods, dynamically monitoring, by the computer via execution of the maintenance scheduling tool, respective amounts of utilization of the server, and for each of the second periods, responsive to a second dynamic determination by the maintenance scheduling tool that the respective amount of utilization of the server is greater than a second predetermined threshold, dynamically changing, via execution of the maintenance scheduling tool, the frequency at which the maintenance tasks on the server are periodically performed, by the computer via execution of the maintenance program tool, to a second, different frequency implied by a constant second time interval to reduce the utilization of the server in order to improve performance of the server, wherein successive performances of the maintenance tasks in each second period are separated in time by the constant second time interval;

in response to the first dynamic determination and/or the second dynamic determination, automatically notifying, by the computer, an administrator of a capacity problem with the server and the dynamically changed frequency of the first frequency and/or the second frequency, respectively, at which the maintenance tasks on the server are periodically performed via execution of the maintenance program tool;

in further response to the first dynamic determination, increasing, by the computer, the available disk space by (i) moving log files stored on the disk space to an archive outside of the disk space or (ii) rolling back the log files to an earlier point in time, wherein the log files include all program activity of the server; and using, by the computer, the program activity included on the log files to track whether the maintenance tasks on the server were started manually or via execution of a scheduling utility.

2. The method of claim 1 wherein the computer is the server.

3. The method of claim 1, wherein in further response to the first dynamic determination, increasing, by the computer, the available disk space by moving the log files, stored on the disk space, to an archive outside of the disk space.

4. A computer program product for detecting a problem with a server, the computer program product comprising:
one or more computer-readable tangible storage devices and program instructions stored on at least one of the one or more storage devices, the program instructions comprising:

program instructions to periodically check at an initial frequency implied by a constant time interval, by a computer using a scheduling utility, a wrapper utility according to a schedule to determine whether or not the wrapper utility that manages execution of a maintenance program tool is running, said maintenance program tool configured to perform maintenance tasks on a server to maintain a system environment in which the server operates;

program instructions to, in response to a determination via the periodic check that the wrapper utility is running, ascertain using the wrapper utility whether or not the maintenance program tool is running;

program instructions to, during each of a plurality of first periods and in response to ascertaining that the maintenance program tool is running, dynamically monitor, by the computer via execution of a maintenance scheduling tool, respective amounts of available disk space in the server, and for each of the first periods, responsive to a first dynamic determination by the maintenance scheduling tool that the respective amount of available disk space is less than a first predetermined threshold, dynamically change, by the computer via execution of the maintenance scheduling tool, the frequency at which the maintenance tasks on the server are periodically performed, via execution of the maintenance program tool, to a first, different frequency implied by a constant first time interval to increase the available disk space to ensure that free disk space is not too low, wherein successive performances of the maintenance tasks in each first period are separated in time by the constant first time interval;

program instructions to, during each of a plurality of second periods, dynamically monitor, by the computer via execution of the maintenance scheduling tool, respective amounts of utilization of the server, and for each of the second periods, responsive to a second dynamic determination by the maintenance scheduling tool that the respective amount of utilization of the server is greater than a second predetermined threshold, dynamically change, by the computer via execution of the maintenance scheduling tool, the frequency at which the maintenance tasks on the server are periodically performed, via execution of the maintenance program tool, to a second, different frequency implied by a constant second time interval to reduce the utilization of the server in order to improve performance of the server, wherein successive performances of the maintenance tasks in each second period are separated in time by the constant second time interval;

program instructions to, in response to the first dynamic determination and/or the second dynamic determination, automatically notify, by the computer, an administrator of a capacity problem with the server and the dynamically changed frequency of the first frequency and/or the second frequency, respectively, at which the maintenance tasks on the server are periodically performed via execution of the maintenance program tool;

program instructions to, in further response to the first dynamic determination, increase, by the computer, the available disk space by (i) moving log files stored on the disk space to an archive outside of the disk space or (ii) rolling back the log files to an earlier point in time, wherein the log files include all program activity of the server; and program instructions to, use, by the computer, the program activity included on the log files to track whether the maintenance tasks on the server were started manually or via execution of a scheduling utility.

5. The computer program product of claim 4 wherein the computer is the server.

6. The computer program product of claim 4, wherein the program instructions comprise:
program instructions to, in further response to the first dynamic determination, increase, by the computer, the available disk space by moving the log files, stored on the disk space, to an archive outside of the disk space.

7. A computer system for detecting a problem with a server, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to periodically check at an initial frequency implied by a constant time interval, by a computer using a scheduling utility, a wrapper utility according to a schedule to determine whether or not the wrapper utility that manages execution of a maintenance program tool is running, said maintenance program tool configured to perform maintenance tasks on a server to maintain a system environment in which the server operates;

program instructions to, in response to a determination via the periodic check that the wrapper utility is running, ascertain using the wrapper utility whether or not the maintenance program tool is running;

program instructions to, during each of a plurality of first periods and in response to ascertaining that the maintenance program tool is running, dynamically monitor, by the computer via execution of a maintenance scheduling tool, respective amounts of available disk space in the server, and for each of the first periods, responsive to a first dynamic determination by the maintenance scheduling tool that the respective amount of available disk space is less than a first predetermined threshold, dynamically change, by the computer via execution of the maintenance scheduling tool, the frequency at which the maintenance tasks on the server are periodically performed, via execution of the maintenance program tool, to a first, different frequency implied by a constant first time interval to increase the available disk space to ensure that free disk space is not too low, wherein successive performances of the maintenance tasks in each first period are separated in time by the constant first time interval;

program instructions to, during each of a plurality of second periods, dynamically monitor, by the computer via execution of the maintenance scheduling tool, respective amounts of utilization of the server, and for each of the second periods, responsive to a second dynamic determination by the maintenance scheduling tool that the respective amount of utilization of the server is greater than a second predetermined threshold, dynamically change, by the computer via execution of the maintenance scheduling tool, the frequency at which the maintenance tasks on the server are periodically performed, via execution of the maintenance program tool, to a second, different frequency implied by a constant second time interval to reduce the utilization of the server in order to improve performance of the server, wherein successive performances of the maintenance tasks in each second period are separated in time by the constant second time interval;

program instructions to, in response to the first dynamic determination and/or the second dynamic determination, automatically notify, by the computer, an administrator of a capacity problem with the server and the dynamically changed frequency of the first frequency and/or the second frequency, respectively, at which the maintenance tasks on the server are periodically performed via execution of the maintenance program tool;

program instructions to, in further response to the first dynamic determination, increase, by the computer, the available disk space by (i) moving log files stored on the disk space to an archive outside of the disk space or (ii) rolling back the log files to an earlier point in time, wherein the log files include all program activity of the server; and program instructions to, use, by the computer, the program activity included on the log files to track whether the maintenance tasks on the server were started manually or via execution of a scheduling utility.

8. The computer system of claim 7 wherein the computer is the server.

9. The computer system of claim 7, wherein the program instructions comprise:

program instructions to, in further response to the first dynamic determination, increase, by the computer, the available disk space by moving the log files, stored on the disk space, to an archive outside of the disk space.

10. The method of claim 1, wherein in further response to the first dynamic determination, increasing, by the computer, the available disk space by rolling back the log files to an earlier point in time.

11. The computer program product of claim 4, wherein in further response to the first dynamic determination, increasing, by the computer, the available disk space by rolling back the log files to an earlier point in time.

12. The computer system of claim 7, wherein in further response to the first dynamic determination, increasing, by the computer, the available disk space by rolling back the log files to an earlier point in time.

* * * * *